United States Patent [19]

Tighe et al.

[11] Patent Number: 5,003,453

[45] Date of Patent: Mar. 26, 1991

[54] APPARATUS FOR A BALANCED THREE PHASE AC POWER SUPPLY IN A COMPUTER HAVING VARIABLE DC LOADS

[75] Inventors: Donald J. Tighe, Danville; Joseph S. Neilson, Cupertino, both of Calif.

[73] Assignee: Tandem Computers Incorporated, Cupertino, Calif.

[21] Appl. No.: 440,967

[22] Filed: Nov. 22, 1989

[51] Int. Cl.$^5$ .................... H02M 7/12; H02M 7/155
[52] U.S. Cl. .......................................... 363/65; 363/3; 307/46; 307/66
[58] Field of Search .............. 363/2, 3, 65, 70, 44–48, 363/124; 307/46, 48, 58, 64, 66, 82

[56] References Cited

U.S. PATENT DOCUMENTS

| | | | |
|---|---|---|---|
| 3,927,362 | 12/1975 | Brewster | 363/3 |
| 3,974,397 | 8/1976 | Killough, Jr. | 363/70 |
| 4,143,414 | 3/1979 | Brewster et al. | 363/65 |
| 4,270,165 | 5/1981 | Carpenter et al. | 363/65 |
| 4,509,108 | 4/1985 | Gallios | 363/45 |
| 4,680,689 | 7/1987 | Payne et al. | 363/44 |

*Primary Examiner*—Peter S. Wong
*Attorney, Agent, or Firm*—Townsend and Townsend

[57] ABSTRACT

A balanced three phase AC power supply for a computer system having unbalanced, variable DC loads. AC to DC converters utilize high power factor correction circuitry to impose a sinusoidal current loading waveshape substantially in phase with the AC voltage. Each AC to DC converter outputs equal DC voltages maintaining a balanced loading on the AC power source. The design and organization of the power supply components make the supply fault tolerant when one phase of AC power or one AC to DC converter is lost due to malfunction or servicing.

13 Claims, 4 Drawing Sheets

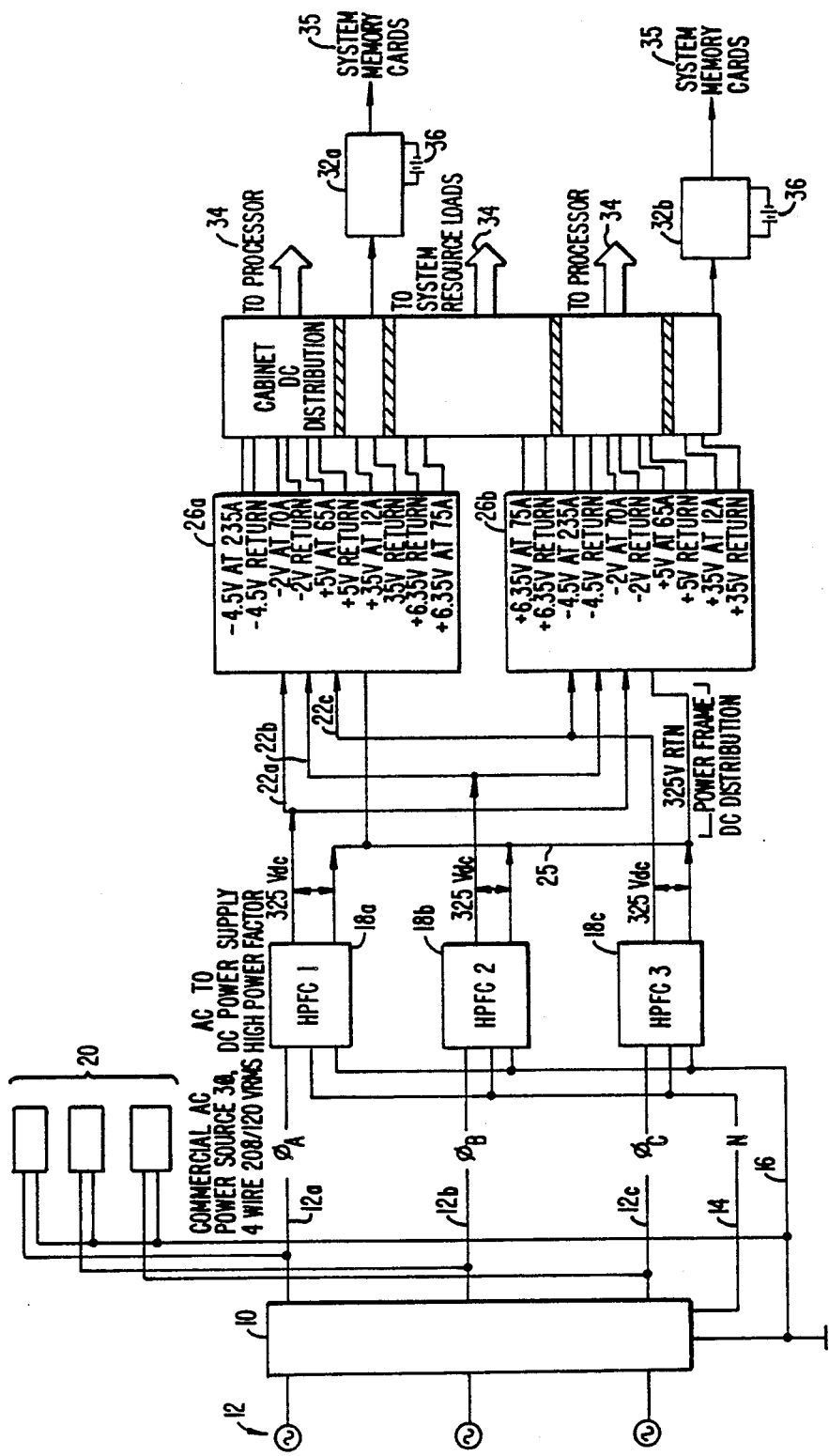
FIG._1.

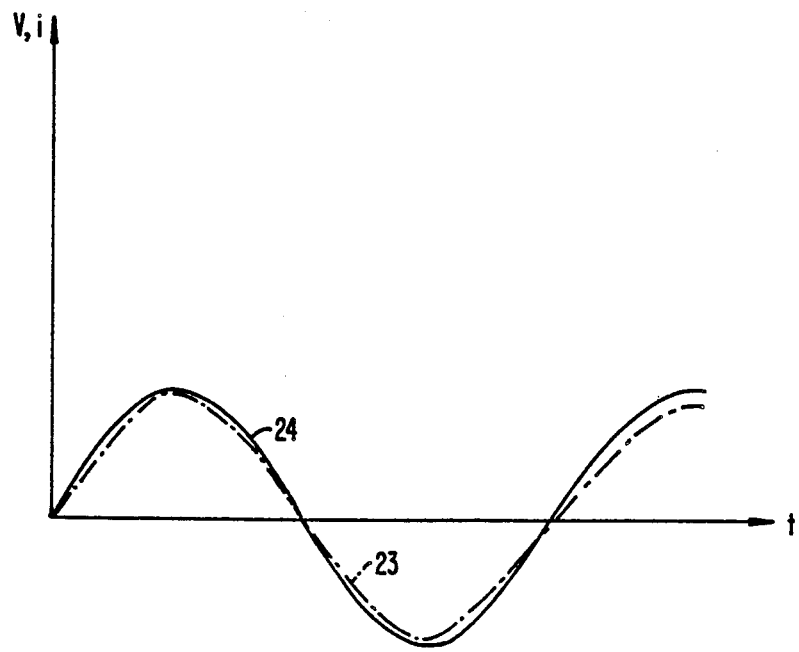
FIG._2.
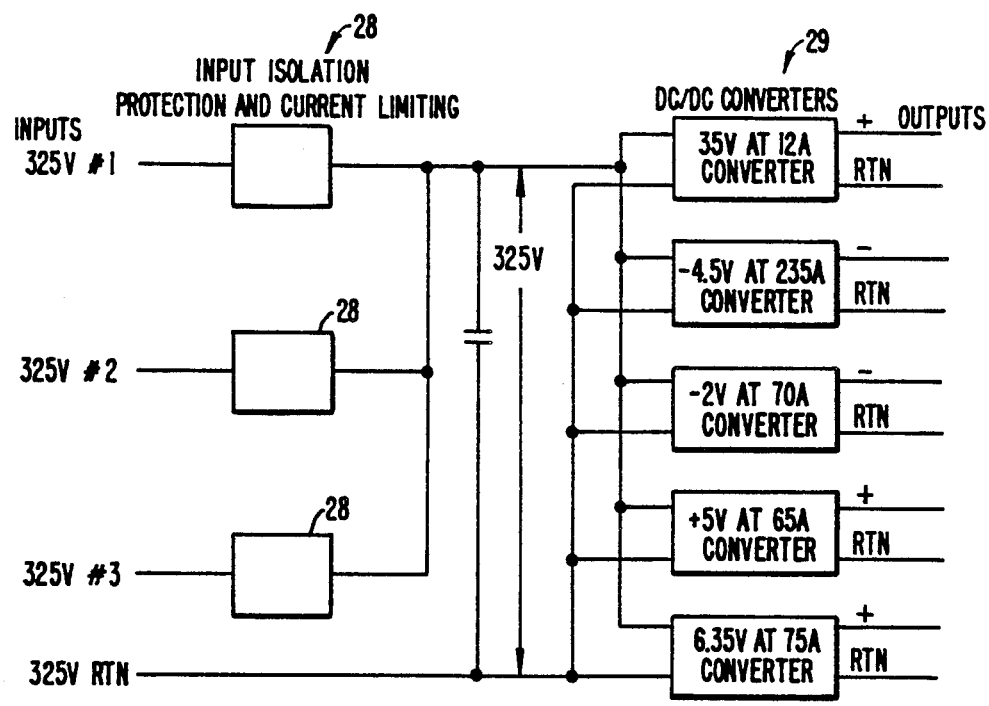
FIG._3.

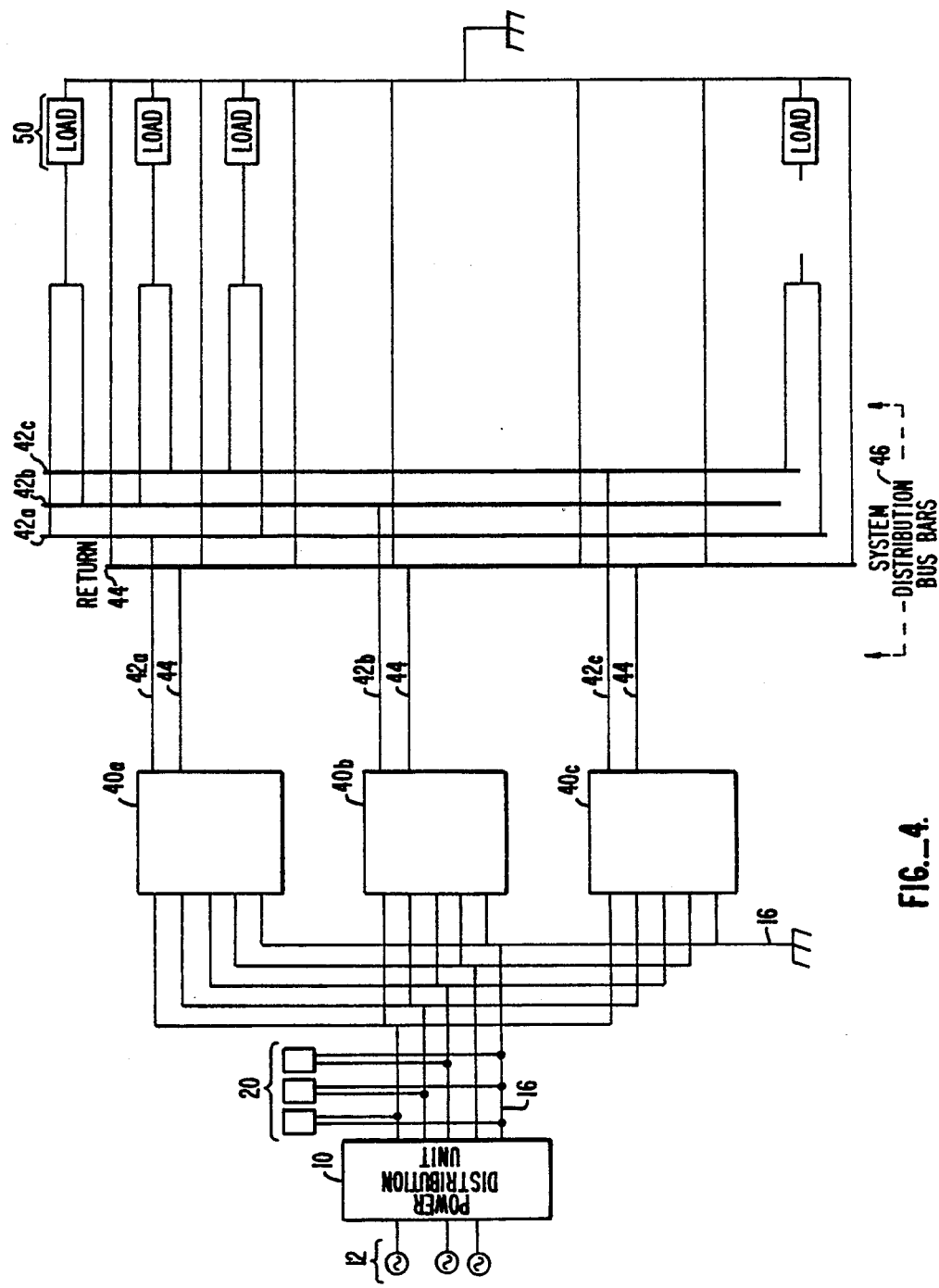

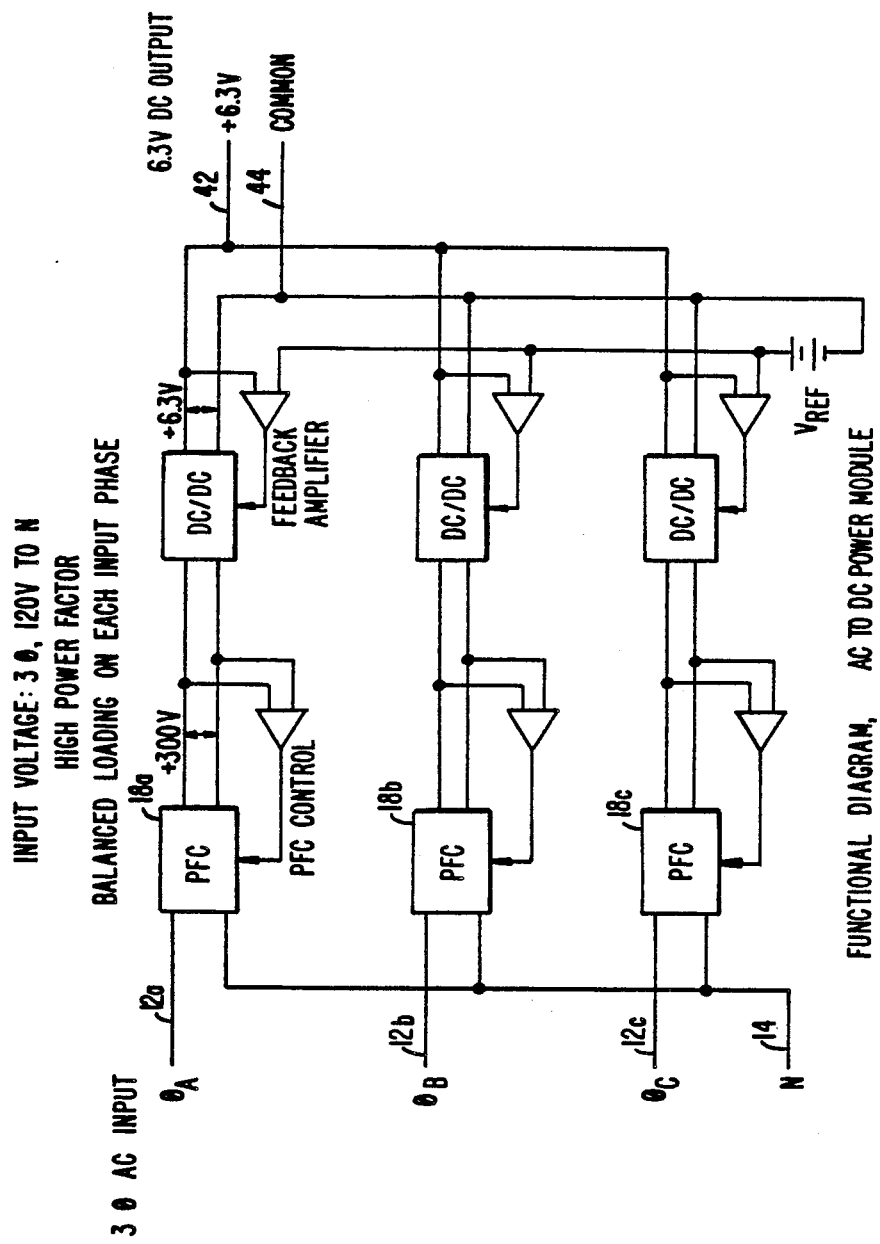

APPARATUS FOR A BALANCED THREE PHASE AC POWER SUPPLY IN A COMPUTER HAVING VARIABLE DC LOADS

BACKGROUND OF THE INVENTION

Most large computers operate on three phase AC power. For systems which consume more than 1.8 to 2.45 K voltAmps, the use of three phase AC power is often a utility company requirement. Three phase AC power systems also aid in the design of fault tolerant computers. When one phase is lost due to a building line disturbance or a circuit breaker trip, the computer system may continue limited operations using the remaining two phases.

In three phase power systems, it is desirable that the phasor sum of the three AC voltages be zero or, in other words, the source loading be balanced. This condition is often a utility company requirement. In the past, computer engineers relied upon the architecture or arrangement of the DC loads in the computer circuit to balance the load on the power source. The loads would be arranged such that the load on each phase of the power source would be equal. Thus to balance the load on the power source, it was necessary to balance the load itself. This requirement limits the combination and arrangement of computer memory and logic circuits available to the computer engineer in the design of the overall computer system.

Maintaining a balanced loading on the power source also reduces requirements on power distribution equipment design. When loading on the AC power source is unbalanced, a net, non-zero current flows in the neutral wire. Power distribution components such as transformers and wires must be adequately sized to handle this current as well as the phase currents. Typical three phase power systems generate current harmonics which impose current waveshape loadings that are neither sinusoidal nor substantially in phase with the voltage loading on the AC power source. As such, the power distribution system must be sized to accommodate these high neutral currents, resulting in increased costs for building power system components and less efficient energy utilization.

In addition to providing design flexibility and reduced component costs, it is also desirable that a computer power supply system be tolerant of power system faults and permit on line servicing of the computer. Computers form an integral part of the infrastructure of the modern world. The loss of a computer for servicing severely hampers the operational efficiency of the many businesses, banks, airlines, factories, etc. which utilize computers to conduct daily operations. As such it is desireable to produce a computer of modular construction such that a troublesome component can be removed for servicing without the need to shut down operation of the entire computer. In a computer system containing a power supply dependant upon the organization of components to maintain load balance, removing a component or a portion of the power supply for servicing results in an unbalanced load.

SUMMARY OF THE INVENTION

The present invention discloses a balanced three phase AC power supply system which supplies power to variable, unbalanced DC loads. This system permits greater flexibility in the design of the computer. In addition, the present invention discloses a means by which the computer will continue to operate when a portion of the power source or the power supply system is lost due to malfunction or servicing. Finally, the present invention discloses a means for balancing the load while reducing the rms current loading on the AC power source through the incorporation of high power factor correction circuits (HPFC). This feature curtails power distribution system hardware costs as well as computer system operating costs.

In one embodiment of the invention, as described in the CPU cabinet power system, three AC to DC converters each convert one distinct phase of the three phase AC power supply to a DC voltage. These DC output voltages are substantially equal. The DC load circuits are connected to each of the three AC to DC converters. Thus, loading of the AC power source is balanced. This embodiment may be made fault tolerant by powering redundant processors through two separate DC to DC converters each connected to all three AC to DC converters. When one phase of AC power is lost, one of the two DC to DC converters shuts down permitting the second DC to DC converter to function normally and power one of the redundant set of processors.

According to another aspect of the invention, as utilized in an input/output cabinet power system, all three phases of the AC source are input into each of three power modules which each contain three AC to DC converters for converting each phase of AC power. The bulk DC voltages output by each power module when one phase is lost is therefore $\frac{2}{3}$ the output when all three phases are available. The load placed on each power module during normal operation is only $\frac{2}{3}$ of the module's rated capacity. Thus, when one phase is lost, the system remains fully operable. In addition, each DC load is connected to two power modules. Thus, a power module may be removed for servicing without disrupting computer operations.

According to yet another aspect of the invention, the invention utilizes high power factor correction circuits (HPFC) to convert each phase of the AC power to a bulk DC voltage. The HPFC imposes a current loading waveshape on the AC power source which is sinusoidal and substantially in phase with the voltage output. This feature reduces the rms current demand on the power source and also reduces current harmonics. The total volt Amps required to operate the computer system is thereby reduced resulting in lower power distribution system equipment costs and lower operating costs.

Other features and advantages of the invention will appear from the following description in which the preferred embodiments have been set forth in detail in conjunction with the accompanied drawings.

BRIEF DESCRIPTION OF THE DRAWINGS

FIG. 1 is a functional block diagram of a CPU cabinet power system;

FIG. 2 is a graph of the current and voltage loading wave shapes imposed on the AC power source by the high power factor correction circuits;

FIG. 3 is a functional block diagram of a DC to DC converter utilized in the CPU cabinet power system;

FIG. 4 is a functional block diagram of an input/output cabinet power system; and FIG. 5 is a functional block diagram of the power module contained in the input/output cabinet power system.

DETAILED DESCRIPTION OF THE PREFERRED EMBODIMENTS

In the drawings like reference numerals indicate identical or corresponding parts throughout the several views. FIG. 1 is a functional block diagram of one embodiment of the invention; a CPU cabinet power system. In this embodiment, a power distribution unit 10 is connected to a three phase AC power source 12 a neutral wire 14 and ground 16. Power distribution unit 10 contains various circuit protection devices. These devices include circuits for overcurrent protection, transient suppression, electromagnetic interference filters and circuit temperature protection controls. Power distribution unit 10 outputs the three phases of AC power, 12a-c, to high power factor correction circuitry (HPFC), 18a-c, such that each phase of AC power is input to one HPFC. The input of each HPFC is also connected to neutral wire 14 and ground 16.

In this embodiment, the output of power distribution unit 10 is also connected to system blowers 20. System blowers 20 circulate air to cool computer system logic circuits. Power distribution unit 10 also contains overcurrent protection circuits for system blowers 20.

Each HPFC 18 converts the input of AC power to a DC bulk voltage. The DC bulk voltages are carried on 22a-c and are substantially equal. The HPFC impose a current loading waveshape 23 which is sinusoidal and substantially in phase with the voltage output 24 by AC power source 12. See FIG. 2. Rms current loading is thereby greatly reduced, in particular peak currents resulting in harmonics. The reduction in rms current loading also means building power distribution components, such as switches and transformers, may be reduced in size. Overall power system costs are thereby greatly reduced. The output of HPFC 18 is also connected to return line 25. HPFC 18 contains various circuit protection devices such as current limiting and inrush limiting circuits. The output of each HPFC 18a-c are connected to two DC to DC converters 26a and 26b.

DC to DC converters 26a and 26b convert the DC bulk voltages to the various load voltages required to operate computer logic circuits and system resources which comprise variable DC loads 34. DC to DC converters 26a-b contain input isolation protection and current limit circuits 28 as seen in FIG. 3. The DC bulk voltages received from HPFC circuits 18a-c are stepped down to the various required load voltages by DC to DC converters 29.

The DC bulk voltages output by converters 26a and 26b are also input to a second set of DC to DC converters 32a-b. Converters 32a-b supply DC voltage to the system memory cards 35. A battery 36, connected to converters 32a-b, supplies an alternate source of DC potential sufficient to retain system memory in the event the three phases of AC power are lost.

The structure of the power system as depicted in FIG. 1 is fault tolerant. The DC loads 34 connected to DC to DC converter 26a are computer logic circuits redundant of DC loads 34 connected to DC to DC converter 26b. Thus, the absence of either DC to DC converter 26a or 26a due to servicing or malfunction permits continued but limited operation of the computer system via the remaining processors powered through the still functioning converter.

The loss of a phase of AC power may occur due to circuit breaker trips, building power distribution system faults, or removal of an HPFC due to malfunction or servicing. Two HPFC 18 are required to operate any one DC to DC converter 26. When an HPFC 18 is removed for servicing, or an input phase is lost, one DC to DC converter 26 is taken off line. As described above, continued but limited computer operation continues via the remaining processors powered through the still functioning converters.

In the event all three phases of AC power are lost, battery 36 connected to DC to DC converter 32, as shown in FIG. 1, supplies an alternate source of DC potential to computer memory cards 35. Thus, information stored in the CPU is retained in the event of a power outage. The battery of the embodiment of FIG. 1 can supply DC potential for a period of two hours.

FIG. 4 shows a functional block diagram of an input-/output cabinet power system. In this embodiment, the power distribution unit 10 again receives input from three phase AC power source 12, neutral wire 14, and ground 16. The three phases of the AC power source 12 are input to system blowers 20 and three power supplies 40a-c. The input of power supplies 40a-c are also connected to neutral wire 14 and ground 16. Each power supply 40 contains HPFC 18 which convert each phase of the AC power source received into a DC voltage. The output port of each power supply 40 is thus connected to a DC bulk voltage line 42a-c and a return wire 44. The DC bulk voltages carried by 42a-c are equal. A functional block diagram of power module 40 is depicted in FIG. 5.

The output lines 42 and 44 are routed through a series of system distribution bus bars 46. Bus bars 46 permit modular interconnection between the various power supply components and the computer logic circuits. The computer logic and memory circuits 50 which comprise the DC load circuits are connected to the output of two of power modules 40 through system bus bar 46.

This embodiment of the invention is also tolerant of power system faults. Each phase of AC power source 12 is input to one of the HPFC AC to DC converters 18 contained within power modules 40 as shown in FIG. 5. Thus, when one phase of AC power source 12 is inoperative, the output of the power module is still ⅔ of the output when all three phases of AC power source 12 are operative. Because the load placed on power module 40 during normal operations is only ⅔ of its rated capacity, sufficient power is thus still distributed to the load circuits in this failure mode.

Furthermore, the organization of the input/output cabinet power system permits servicing of power modules 40 without hindering computer function. Because the DC loads are connected to two power modules, a power module can be inoperative due to malfunction, or removed for servicing, without affecting operation of the computer and still maintaining a balanced load on the AC power source 12.

The preferred embodiments have thus been described. Substitution and modifications, within the scope of the invention, will now be apparent to skilled practitioners in the art. For example, the CPU cabinet power system could be designed to contain HPFC 18 of sufficient capacity such that only two HPFC are required to power both DC to DC converters 26a and b. Thus, if one HPFC failed or an input phase was lost, all processing circuits 34 would continue to function. Also, battery 36 may be of sufficient capacity to supply DC potential to computer memory circuits for periods of greater than two hours in the event of a power outage. The embodiments of the invention should therefore be construed in light of the claims and not the description contained herein.

What is claimed is:

1. A balanced power supply connected to a three phase AC power source for a computer system having variable DC loads comprising:
   (a) three AC to DC converters each having an input port and an output port which generate a substantially equal DC output voltage at each output port;
   (b) means for electrically coupling the input port of each AC to DC converter to one phase of the three phase AC power source, a neutral wire and ground such that each phase of the three phase AC power circuit is coupled to only one of the three AC to DC converters;
   (c) means for electrically coupling the output port of each AC to DC converter to a return and to each variable DC load.

2. The invention of claim 1 in which the three AC to DC converters further comprise high power factor correction circuits.

3. The invention of claim 1 in which the means for electrically coupling the variable DC loads to the output port of the AC to DC converters includes at least one DC to DC converter disposed between the output port of the AC to DC converters and the variable DC loads.

4. A balanced power supply connected to a three phase AC power source when redundantly powering a computer system having variable DC loads comprising:
   (a) three power modules each having an input port and an output port which generate a substantially equal DC output voltage at each output port;
   (b) means for electrically coupling the input port of each power module to all three phases of the three phase AC power source, a neutral wire and ground;
   (c) means for electrically coupling the output port of each power module to the variable DC loads such that each of the variable DC loads is electrically coupled to the output port of at least two power modules.

5. The invention of claim 4 in which each of said power modules comprises:
   (a) three AC to DC converters each having an input port and an output port;
   (b) means for electrically coupling the input port of each AC to DC converter to one phase of the three phase AC power source such that each phase of the three phase AC power source is electrically coupled to only one of the three AC to DC converters; and
   (c) means for electrically coupling the output port of each AC to DC converter to the output port of the power module.

6. The invention of claim 5 in which each of said AC to DC converters comprises high power factor correction circuits.

7. A balanced power supply connected to a three phase AC power source for a computer system having variable DC loads comprising:
   (a) three AC to DC converters each having an input port and an output port which generate a substantially equal DC output voltage at each output port;
   (b) means for electrically coupling the input of each AC to DC converter to one phase of the three phase AC power source, a neutral wire and ground such that each phase of the three phase AC power source is electrically coupled to only one of the three AC to DC converters;
   (c) a first and second DC to DC converter, each having an input port electrically coupled to the output port of each AC to DC converter and an output port electrically coupled to the variable DC loads;
   (d) a third and fourth DC to DC converter, each having an input port and an output port;
   (e) means for electrically coupling the input port of the fourth DC to DC converter to the output port of the second DC to DC converter and to a secondary source of DC potential;
   (f) means for electrically coupling the input port of the third DC to DC converter to the output port of the first DC to DC converter and to a secondary source of DC potential; and
   (g) means for electrically coupling the output port of the third and fourth DC to DC converters to the variable DC loads.

8. The invention of claim 7 in which the three AC to DC converters further comprise high power factor correction circuits.

9. The invention of claim 7 in which the means for supplying a secondary source of DC potential comprises a battery.

10. A balanced power supply connected to a three phase AC power source for a computer system having variable DC loads comprising:
    (a) three high power factor correction circuits each having an input port and an output port which generate a substantially equal DC output voltage at each output port;
    (b) means for electrically coupling the input port of each high power factor correction circuit to one phase of the three phase AC power source, a neutral wire and ground such that each phase of the three phase AC power circuit is coupled to only one of the three high power factor correction circuits therefor;
    (c) means for electrically coupling each high power factor correction circuit to a return and to each variable DC load.

11. A balanced power supply connected to a three phase AC power supply when redundantly powering a computer system having variable DC loads comprising:
    (a) three power modules each having high voltage power correction circuits and an input port and an output port which generate a substantially equal DC output voltage at each output port;
    (b) means for electrically coupling the input port of each power module to all three phases of the three phase AC power source, a neutral wire and ground; and
    (c) means for electrically coupling the output port of each power module to the variable DC loads such that each of the variable DC loads is electrically coupled to the output port of at least two power modules.

12. A balanced power supply connected to a three phase AC power source for a computer system having variable DC loads comprising:
    (a) three high power factor correction circuits each having an input port and an output port which generate a substantially equal DC output voltage at each output port;

(b) means for electrically coupling the input of each high power factor correction circuit to one phase of the three phase AC power source, a neutral wire and ground such that each phase of the three phase AC power source is electrically coupled to only one of the three high power factor correction circuits;

(c) a first and second DC to DC converter, each having an input port electrically coupled to the output port of each high power factor correction circuit and an output port electrically coupled to the variable DC loads;

(d) a third and fourth DC to DC converter, each having an input port and an output port;

(e) means for electrically coupling the input port of the fourth DC to DC converter to the output port of the second DC to DC converter and to a secondary source of DC potential;

(f) means for electrically coupling the input port of the third DC to DC converter to the output port of the first DC to DC converter and to a secondary source of DC potential; and (g) means for electrically coupling the output port of the third and fourth DC to DC converters to the variable DC loads.

13. The invention of claim 12 in which the means for supplying a secondary source of DC potential comprises a battery.

* * * * *